(12) United States Patent
Nguyen

(10) Patent No.: US 12,431,717 B2
(45) Date of Patent: Sep. 30, 2025

(54) BIDIRECTIONAL POWER MANAGEMENT TECHNIQUES

(71) Applicant: Tahoe Research, Ltd., Dublin (IE)

(72) Inventor: Don J. Nguyen, Portland, OR (US)

(73) Assignee: Tahoe Research, Ltd., Dublin (IE)

( * ) Notice: Subject to any disclaimer, the term of this patent is extended or adjusted under 35 U.S.C. 154(b) by 31 days.

(21) Appl. No.: 18/338,152

(22) Filed: Jun. 20, 2023

(65) Prior Publication Data

US 2023/0336002 A1 Oct. 19, 2023

Related U.S. Application Data

(60) Continuation of application No. 17/228,551, filed on Apr. 12, 2021, now Pat. No. 11,721,983, which is a continuation of application No. 15/723,150, filed on Oct. 2, 2017, now Pat. No. 10,992,151, which is a continuation of application No. 14/601,526, filed on Jan. 21, 2015, now Pat. No. 9,780,590, which is a division of application No. 13/715,951, filed on Dec. 14, 2012, now Pat. No. 9,018,918, which is a continuation of application No. 11/967,314, filed on Dec. 31, 2007, now Pat. No. 8,358,107.

(51) Int. Cl.
*H02J 7/00* (2006.01)
*H02J 7/14* (2006.01)

(52) U.S. Cl.
CPC .............. *H02J 7/00* (2013.01); *H02J 7/0068* (2013.01); *H02J 7/0069* (2020.01); *H02J 7/007188* (2020.01); *H02J 2207/20* (2020.01)

(58) Field of Classification Search
CPC .......... H02J 7/00; H02J 7/0068; H02J 7/0069; H02J 7/007188; H02J 2207/20

USPC ........................................................ 320/134
See application file for complete search history.

(56) References Cited

U.S. PATENT DOCUMENTS 5,604,426 A 2/1997 Okamura et al.
5,969,438 A 10/1999 Odaohara
(Continued)

FOREIGN PATENT DOCUMENTS

AT 399625 B 6/1995
CN 101043151 A 9/2007
(Continued)

OTHER PUBLICATIONS

Final Office Action from U.S. Appl. No. 11/967,314 notified Oct. 28, 2011, 7 pgs.
(Continued)

*Primary Examiner* — Alexis B Pacheco
(74) *Attorney, Agent, or Firm* — Studebaker Brackett PLLC

(57) ABSTRACT

Power management techniques are disclosed. For instance, an apparatus may include a bidirectional voltage converter circuit, and a control module that selectively operates the bidirectional voltage converter circuit in a charging mode and a delivery mode. The charging mode converts a voltage provided by an interface (e.g., a USB interface) into a charging voltage employed by an energy storage module (e.g., a rechargeable battery). Conversely, the delivery mode converts a voltage provided by the energy storage module into a voltage employed by the interface. Other embodiments are described and claimed.

62 Claims, 5 Drawing Sheets

(56) References Cited

U.S. PATENT DOCUMENTS

| | | | |
|---|---|---|---|
| 6,043,629 | A | 3/2000 | Ashley et al. |
| 6,127,801 | A | 10/2000 | Manor |
| 6,205,035 | B1 | 3/2001 | Vollmer et al. |
| 6,243,277 | B1 | 6/2001 | Sun et al. |
| 6,304,059 | B1 | 10/2001 | Chalasani et al. |
| 6,320,358 | B2* | 11/2001 | Miller ................ H02M 3/1582 323/224 |
| 6,380,715 | B1* | 4/2002 | Kubo .................... H01M 10/44 320/128 |
| 6,633,932 | B1 | 10/2003 | Bork et al. |
| 6,690,585 | B2* | 2/2004 | Betts-LaCroix .... H02M 3/1584 363/16 |
| 6,809,560 | B1 | 10/2004 | Wrathall |
| 6,917,181 | B2 | 7/2005 | Emori et al. |
| 8,358,107 | B2 | 1/2013 | Nguyen |
| 9,018,918 | B2 | 4/2015 | Nguyen |
| 9,780,590 | B2* | 10/2017 | Nguyen .................... H02J 7/00 |
| 10,992,151 | B2 | 4/2021 | Nguyen |
| 2004/0135545 | A1 | 7/2004 | Fowler et al. |
| 2005/0127868 | A1* | 6/2005 | Calhoon ................ H02J 50/10 320/108 |
| 2005/0156574 | A1 | 7/2005 | Sato et al. |
| 2005/0162131 | A1* | 7/2005 | Sennami ............. H01M 50/269 320/128 |
| 2005/0201734 | A1 | 9/2005 | Kimura et al. |
| 2006/0181244 | A1 | 8/2006 | Luo et al. |
| 2007/0009770 | A1 | 1/2007 | Takada et al. |
| 2007/0047100 | A1 | 3/2007 | Takahashi et al. |
| 2008/0054855 | A1 | 3/2008 | Hussain et al. |
| 2008/0136374 | A1 | 6/2008 | Nelson et al. |
| 2008/0150488 | A1 | 6/2008 | Lu et al. |
| 2008/0179955 | A1* | 7/2008 | Nakashima ............... H02J 7/34 320/101 |
| 2008/0197801 | A1* | 8/2008 | Manor .................... H02J 7/342 320/103 |
| 2008/0197819 | A1 | 8/2008 | Thompson et al. |
| 2009/0015229 | A1 | 1/2009 | Kotikalapoodi |
| 2009/0103341 | A1* | 4/2009 | Lee ....................... B60W 10/26 320/140 |
| 2009/0212741 | A1 | 8/2009 | Ferguson |
| 2009/0236916 | A1* | 9/2009 | Nishimura ............. H02J 3/381 307/80 |
| 2010/0060239 | A1* | 3/2010 | Lundqvist ................ H02J 1/10 320/138 |
| 2011/0148344 | A1 | 6/2011 | Manor et al. |
| 2013/0099750 | A1 | 4/2013 | Nguyen |

FOREIGN PATENT DOCUMENTS

| | | |
|---|---|---|
| DE | 10320284 A1 | 12/2004 |
| EP | 1864849 A1 | 12/2007 |
| JP | 2003-029885 A | 1/2003 |
| JP | 2003-304644 A | 10/2003 |
| JP | 2005-012889 A | 1/2005 |
| JP | 2005-259323 A | 9/2005 |
| JP | 2005-287278 A | 10/2005 |
| JP | 2007-097252 A | 4/2007 |
| JP | 2007-252154 A | 9/2007 |
| JP | 2007-318849 A | 12/2007 |
| JP | 2007-336698 A | 12/2007 |
| WO | 2007/145268 A1 | 12/2007 |
| WO | 2008/075140 A1 | 6/2008 |

OTHER PUBLICATIONS

Final Office Action from U.S. Appl. No. 13/715,951 notified May 8, 2014, 9 pgs.
Final Office Action from U.S. Appl. No. 11/967,314 notified Oct. 28, 2010, 7 pgs.
International Preliminary Report on Patentability from PCT/US2008/084993 notified Jul. 15, 2010, 7 pgs.
International Search Report and Written Opinion from PCT/US2008/084993 notified Jun. 24, 2009, 12 pgs.
Non-Final Office Action from Chinese Patent Application No. 200880123994.9 notified Oct. 19, 2015, 14 pgs.
Non-Final Office Action from Chinese Patent Application No. 200880123994.9 notified Jun. 3, 2016, 21 pgs.
Non-Final Office Action from Chinese Patent Application No. 200880123994.9 notified May 6, 2014, 7 pgs.
Non-Final Office Action from Chinese Patent Application No. 200880123994.9 notified May 9, 2013, 6 pgs.
Non-Final Office Action from Chinese Patent Application No. 200880123994.9 notified Oct. 10, 2012, 7 pgs.
Non-Final Office Action from Chinese Patent Application No. 200880123994.9 notified Oct. 23, 2013, 6 pgs.
Non-Final Office Action from Chinese Patent Application No. 201610024458.X notified Dec. 5, 2018, 9 pgs.
Non-Final Office Action from Chinese Patent Application No. 201610024458.X notified Jul. 26, 2017, 10 pgs.
Non-Final Office Action from Chinese Patent Application No. 201610791606.0 notified Apr. 19, 2018, 7 pgs.
Non-Final Office Action from Chinese Patent Application No. 201610791606.0 notified Mar. 4, 2019, 21 pgs.
Non-Final Office Action from German Patent Application No. 112008003519.9 notified Dec. 15, 2014, 9 pgs.
Non-Final Office Action from Japanese Patent Application No. 2010-540710 notified Dec. 20, 2011, 2 pgs.
Non-Final Office Action from Japanese Patent Application No. 2010-540710 notified Jan. 22, 2013, 1 pg.
Non-Final Office Action from Japanese Patent Application No. 2010-540710 notified Sep. 27, 2012, 1 pg.
Non-Final Office Action from Japanese Patent Application No. 201610024458.X notified Jun. 4, 2018, 9 pgs.
Non-Final Office Action from Korean Patent Application No. 2010-7014571 notified Jan. 9, 2012, 3 pgs.
Non-Final Office Action from U.S. Appl. No. 11/967,314 notified May 12, 2011, 8 pgs.
Non-Final Office Action from U.S. Appl. No. 13/715,951 notified Nov. 8, 2013, 9 pgs.
Non-Final Office Action from U.S. Appl. No. 15/723,150 notified May 28, 2010, 9 pgs.
Non-Final Office Action from U.S. Appl. No. 15/723,150 notified Aug. 5, 2020, 13 pgs.
Non-Final Office Action from United Kingdom Patent Application No. GB1010825.6 notified Jul. 5, 2012, 2 pgs.
Notice of Allowance from Korean Patent Application No. 2010-7014571 notified Aug. 30, 2012, 3 pgs.
Notice of Allowance from U.S. Appl. No. 11/967,314 notified Sep. 11, 2012, 11 pgs.
Notice of Allowance from U.S. Appl. No. 13/715,951 notified Oct. 21, 2014, 8 pgs.
Notice of Allowance from U.S. Appl. No. 14/601,526 notified May 4, 2017, 9 pgs.
Notice of Allowance from U.S. Appl. No. 15/723,150 notified Dec. 2, 2020, 9 pgs.
Office Action from Chinese Patent Application No. 201610024458.X notified Jun. 25, 2019, 25 pgs.
Office Action from Chinese Patent Application No. 201610024458.X notified Mar. 5, 2020, 15 pgs.
Office Action from Chinese Patent Application No. 201610024458.X notified May 15, 2020, 23 pgs.
Office Action from Chinese Patent Application No. 201610791606.0 notified May 9, 2020, 27 pgs.
Office Action from Chinese Patent Application No. 201610791606.0 notified Nov. 28, 2019, 24 pgs.
Office Action from Chinese Patent Application No. 201610791606.0 notified Sep. 3, 2020, 12 pgs.
Office Action from German Patent Application No. 112008004283.7 notified Jun. 19, 2020, 7 pgs.
Restriction Requirement from U.S. Appl. No. 13/715,951 notified Oct. 3, 2013, 6 pgs.
Restriction Requirement from U.S. Appl. No. 11/967,314 notified Mar. 19, 2010, 8 pgs.
Restriction Requirement from U.S. Appl. No. 15/723,150 notified Jun. 3, 2019, 6 pgs.

(56) References Cited

OTHER PUBLICATIONS

Tolbert, Leon M. et al., "A Bi-Directional DC-DC Converter with Minimum Energy Storage Elements", 2002 IEEE Industry Applications Conference, vol. 3, Oct. 2002.

Glen Chandler et al., "On-The-Go Supplement to the USB 2.0 Specification", Revision 1.0a, Jun. 24, 2003, USB Implementers Forum, Inc., pp. 1-69.

* cited by examiner

BIDIRECTIONAL POWER MANAGEMENT TECHNIQUES

CROSS-REFERENCE TO RELATED APPLICATIONS

This application is a Continuation of U.S. patent application Ser. No. 17/228,551 filed Apr. 12, 2021, which is a Continuation of U.S. patent application Ser. No. 15/723,150 filed Oct. 2, 2017, issued as U.S. Pat. No. 10,992,151 on Apr. 27, 2021, which is a Continuation of U.S. patent application Ser. No. 14/601,526 filed Jan. 21, 2015, issued as U.S. Pat. No. 9,780,590 on Oct. 3, 2017, which is a Divisional of U.S. patent application Ser. No. 13/715,951 filed Dec. 14, 2012, issued as U.S. Pat. No. 9,018,918 on Apr. 28, 2015, which is a Continuation of U.S. patent application Ser. No. 11/967,314 filed Dec. 31, 2007, issued as U.S. Pat. No. 8,358,107 on Jan. 22, 2013, the entire contents of which are incorporated herein by reference.

BACKGROUND

Mobile devices, such as smart phones and personal digital assistants (PDAs), may provide various processing capabilities. For example, mobile devices may provide users with Internet browsing, word processing, spreadsheets, synchronization of information (e.g., e-mail) with a desktop computer, and so forth.

A typical mobile device includes a battery that delivers power to components within the mobile device. Also, the battery may provide power to attached devices. Furthermore, the battery may be charged by such attached devices. Connections with attached devices may be provided through various interfaces. Such interfaces may provide media (e.g., conductive line(s), wireless channels, etc.) for the transfer of information as well as power. Universal Serial Bus (USB) is an example of such an interface.

Often, size and cost are important reductions are important design goals for devices. Accordingly, it may be desirable to reduce the cost and size of components that exchange power between attached devices and energy storage components.

DETAILED DESCRIPTION

Various embodiments may be generally directed to power management techniques. For instance, an apparatus may include a bidirectional voltage converter circuit, and a control module that selectively operates the bidirectional voltage converter circuit in a charging mode and a delivery mode. The charging mode converts a voltage provided by an interface (e.g., a USB interface) into a charging voltage employed by an energy storage module (e.g., a rechargeable battery). Conversely, the delivery mode converts a voltage provided by the energy storage module into a voltage employed by the interface. Embodiments may advantageously provide size and cost reductions over conventional arrangements that provide separate circuits for charging and delivery modes of operation.

Embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
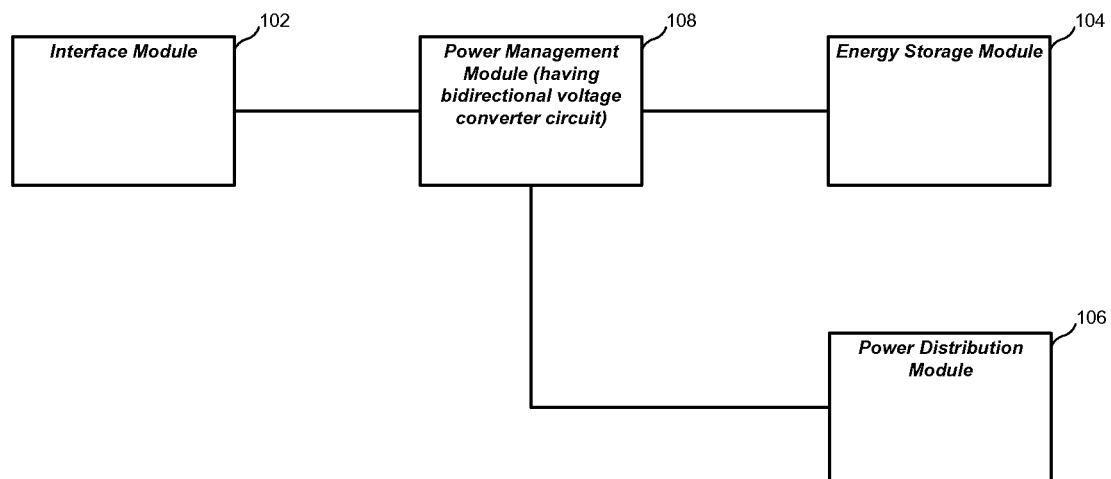
FIG. 1 is a diagram of an apparatus embodiment.

FIG. 1 is a diagram of an apparatus 100 that may employ techniques described herein. Apparatus 100 may include various elements. For instance, FIG. 1 shows apparatus 100 including an interface module 102, an energy storage module 104, a power distribution module 106, and a power management module 108. These elements may be implemented in hardware, software, firmware, or any combination thereof.

Apparatus 100 may be included in a mobile communications device, such as a smartphone, a PDA, or a mobile interface device (MID). However, apparatus 100 may be included in other types of devices, such as a laptop computer, a desktop computer, and so forth. The embodiments, however, are not limited to these examples.

Interface module 102 provides for the exchange of information with attached devices (e.g., external devices). Also, interface module 102 provides for the flow of power. This flow of power may be to or from such attached devices. Exemplary attached devices include jump drives, computing devices (e.g., desktop and laptop computers), printers, modems, and various peripheral devices. In addition, such attached devices may include a power adapter that provides power (e.g., power at a DC voltage) to apparatus 100. However, other types of attached devices may be employed.

In embodiments, interface module 102 may provide for connections with such attached devices through a universal serial bus (USB) interface. USB interfaces employ a twisted pair data cable to transmit signals. This twisted pair includes a first signal line called D+, and a second signal line called D−. In addition, a USB interface provides a single line for the transfer of power. In accordance with USB standards, this power line operates at 5 volts DC (within a tolerance of ±5%).

Although a USB interface is described herein, embodiments are not limited to employing such interfaces. Moreover, embodiments are not limited to interfaces that employ power at 5 volts DC.

Energy storage module 104 stores energy that may provide operational power to components within apparatus 100, as well as to attached devices (e.g., devices connected through interface module 102). Accordingly, energy storage module 104 may comprise one or more batteries and/or cells implemented according to various storage technologies. Such technologies may be rechargeable.

For instance, energy storage module 104 may comprise a rechargeable lithium ion (Li-ion) battery having a cell voltage between 3.0 volts and 4.2 volts. However, other types of technologies may be employed. Examples of such technologies include lead and sulfuric acid, nickel cadmium (NiCd), nickel metal hydride (NiMH), lithium ion polymer (Li-ion polymer), and so forth.

Accordingly, in embodiments, interface module 102 and energy storage module 104 may employ different operational voltages. For instance, interface module 102 may employ a 5 volt USB interface and energy storage module 104 may employ a 3.0 volt to 4.2 volt Li-ion technology. Apparatus 100, however, is not limited to this implementation. Thus, other combinations of operational voltages may be employed.

As described above, apparatus 100 may be included in a device (e.g., a mobile communications device, etc.). More particularly, apparatus 100 may be included in a device's motherboard. However, embodiments are not limited to this arrangement. Power distribution module 106 provides for the distribution of power to such a device's components. These components may require different operational voltages. Accordingly, power distribution module 106 may include one or more DC to DC converter circuits. In embodiments, power distribution module 106 may operate on voltage provided by energy storage module 104, as well as on voltages provided by interface module 102 (e.g., from attached devices).

Power management module 108 manages the flow of power for apparatus 100. In particular, power management module 108 may direct apparatus 100 to operate according to various modes regarding the transfer of power. Examples of such modes include a delivery mode and a charging mode.

In the delivery mode, power flows from battery 104 (or other operational power source provided by apparatus 100) to an attached device through interface module 102. However, in the charging mode, power flows from interface module 102 to battery 104.

Thus, power management module 108 provides for the bidirectional flow of power. In embodiments, this feature is provided through a bidirectional voltage converter circuit within power management module 108. As described above, conventional approaches employ separate conversion circuits: a circuit for charging mode, and a circuit for delivery mode. Accordingly, embodiments may advantageously provide cost and size savings.

Figure 2:
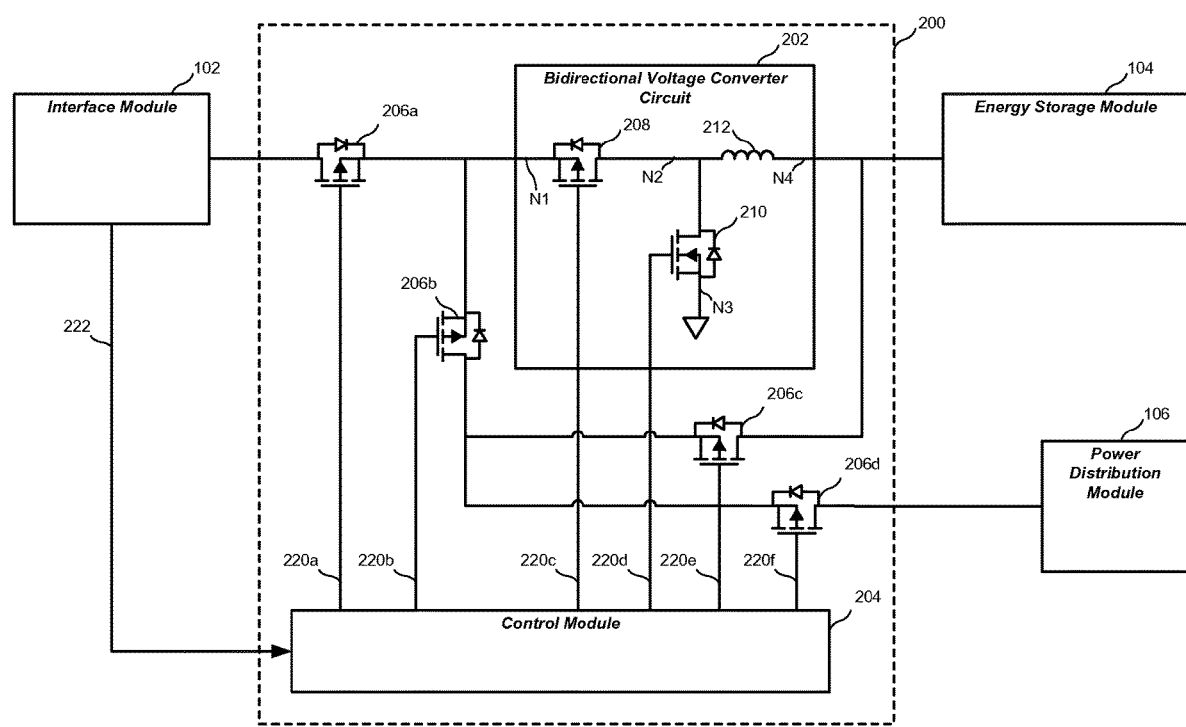
FIGS. 2 and 3 are diagrams showing implementation embodiments.

FIG. 2 is a diagram of an implementation 200 that may be included in power management module 108. Implementation 200 may include various elements. For instance, FIG. 2 shows implementation 200 including a bidirectional voltage converter circuit 202 and a control module 204. Also, implementation 200 is shown including switching elements 206*a-d*.

For purposes of illustration, implementation 200 is shown being coupled to elements of FIG. 1 (interface module 102, energy storage module 104, and power distribution module 106). For instance, implementation 200 may be coupled to a power line of interface module 102 (e.g., a USB power line). Also, implementation 200 may be coupled to a terminal (e.g., an anode) of energy storage module 104. Embodiments, however, are not limited to the context of FIG. 1. Thus, apparatus 200 may be coupled to other elements (e.g., other interfaces, energy storage components, and/or power distribution components).

Bidirectional voltage converter circuit 202 provides conversions between voltages employed by interface module 104 and an energy storage module 104. This conversion may be in either direction. For instance, bidirectional voltage converter circuit 202 may convert a voltage provided by energy storage module 104 into a voltage employed by interface module 102. Conversely, bidirectional voltage converter circuit 202 may convert a voltage provided by interface module 102 into a charging voltage employed by energy storage module 104. The manner and direction of such conversions is directed by control module 204.

As shown in FIG. 2, bidirectional voltage converter circuit 202 includes a first switching element 208, a second switching element 210, and an inductance 212. FIG. 2 shows that switching elements 208 and 210 may be implemented as metal oxide semiconductor field effect transistors (MOSFETs). In particular, switching element 208 is shown as a P-channel MOSFET, while switching element 210 is shown as an N-channel MOSFET. However, other types of devices may be employed.

In particular, FIG. 2 shows switching element 208 coupled between a node N1 and a node N2. In turn, switching element 210 is coupled between node N2 and a node N3. Finally, inductance 212 is coupled between node N2 and a node N4. As shown FIG. 2, node N3 may be a ground node.

As described above, control module 204 directs the conversion of voltages by bidirectional voltage converter circuit 202. In particular, control module 204 generates control signals 220*c* and 220*d* to control switching elements 208 and 210 within bidirectional voltage converter circuit 202. These control signals establish whether the corresponding switching elements are in an ON (closed) state or an OFF (open) state.

As, described above, implementation 200 includes switching elements 206*a-d*. FIG. 2 shows these elements being implemented as MOSFETs. However, other types of devices may be employed. Control module 204 operates switching elements 206*a*, 206*b*, 206*c*, and 206*d* through control signals 220*a*, 220*b*, 220*e*, and 220*f*, respectively. These control signals establish whether the corresponding switching elements are in an ON state or an OFF state.

The manner in which control signals 220*a-e* are generated is based on a mode of operation of implementation 200. Such modes include a charging mode and a delivery mode. Control module 204 may select among such modes based on information 222 obtained from interface module 102. Control signal 220*f* is generated based on whether power distribution module 106 is to deliver power to various components. For instance, control signal 220*f* may place switching element 206*d* in an ON state to deliver such power. This may be based on a user selection and/or on automatic power delivery procedures. Control module 204 may be implemented in hardware, software, firmware, or any combination thereof.

The charging mode involves power flowing from an attached device through interface module 102. More particularly, control module 204 employs switching techniques that convert a voltage employed by interface module 102 to a voltage employed by energy storage module 104. As a result of this flow of power, energy storage module 104 may be charged.

In the charging mode, control module 204 sets switching elements 206*a-d* in a way such that power provided by an attached device (coupled to interface module 102) charges energy storage module 104 (through bidirectional voltage converter circuit 202). Details regarding the setting of these switches are provided below in greater detail.

Within bidirectional voltage converter circuit 202, switching element 208 connects the power provided from the attached device (through interface module 102) to inductance 212 in a chopped mode at a particular frequency. An exemplary frequency is 300 kHz. However, other frequencies may be employed.

During times when switching element 208 is in an ON state, current flows from interface module 102 to inductance 212 and ramps up to a needed charging current (this occurs during constant-current time). However, during times when switching element 208 is in an OFF state, switching element 210 is placed in an ON state (this may occur a short time interval after switching element 208 is placed in an OFF state). This turning on of switching element 210 is performed to keep current flowing through inductance 212. While switching element 210 is in the ON state, the current through inductance 212 may ramp down from a positive peak value to a minimum value.

This switching of elements 208 and 210 may continue at the frequency (e.g., 300 kHz) until battery 104 is completely charged. At this point, switching elements 208 and 210 may both be placed in the OFF state. The switching characteristics (e.g., frequency and duty cycle) of switching elements 208 and 210 may be selected to provide energy storage module 104 with a regulated charging voltage level.

Unlike the charging mode, the delivery mode involves power flowing from energy storage module 104 (or other power source) to an attached device through interface module 102. More particularly, control module 104 employs switching techniques that convert the voltage of energy storage module 104 to the voltage employed by interface module 102.

In the delivery mode, control module 204 sets switching elements 206a-d in a way that power provided by energy storage module 104 is delivered (through bidirectional voltage converter circuit 202) to a device that is coupled to interface module 102. In addition, these switching elements are set to deliver power from energy storage module 104 to power distribution module 106. Details regarding the setting of these switches are provided below in greater detail.

Within bidirectional voltage converter circuit 202, switching elements 208 and 210 behave differently in the delivery mode than in the charging mode. For instance, switching element 210 behaves as a primary switching device. Thus, switching element 210 connects the power provided from energy storage module 104 to inductance 212 in a chopped mode at a particular frequency. An exemplary frequency is 300 kHz. However, other frequencies may be employed.

When in an ON state, switching element 210 connects inductance 212 to ground. As a result, the voltage level of energy storage module 104 causes current through inductance 212 to ramp up. However, the current of inductance 212 flows through the body diode of switching element 208 when switching element 210 is in an OFF state. As described above, switching element 208 may be implemented as a P-channel MOSFET. Through this feature, the current of inductance 212 flows through its body-diode to interface module 102.

In embodiments, switching element 208 may be placed in an ON state during the time that its body-diode steers current from inductance 212 to interface module 102 (i.e., when switching element 210 is in an OFF state). This may advantageously reduce power loss in the body diode and provide a more efficient voltage conversion.

The switching characteristics (e.g., frequency and duty cycle) of switching element 210 may be selected to provide an attached device with a regulated voltage level employed by interface module 102.

FIG. 2 shows that control module 204 receives information 222 from interface module 102. This information conveys characteristics regarding a device attached through interface module 102. For example, such characteristics may include whether the attached device provides power or needs power. Based on this information, control module 204 determines an operational mode (e.g., delivery mode or charging mode). In addition, control module 204 may determine operational parameters based on information 222. Such operational parameters may include settings for switching elements 206a-206d. In addition, such operational parameters may include switching characteristics (frequency, duty cycle, timing, etc.) of switching elements 208 and 210 within bidirectional voltage converter circuit 202.

As described above, control module 204 sets switching elements 206a-d according to whether the delivery mode or the charging mode is being employed.

For example, in the charging mode, switching element 206a is set in an ON state to deliver power from interface module 102 to bidirectional voltage converter circuit 202. Also, switching element 206b is set in an ON state. This provides for the delivery of power to power distribution module 106 (if switching element 206d is also in an ON state). Also, in the charging mode, control module 204 sets switching element 206c to an OFF state. This prevents energy storage module 104 from delivering power to power distribution module 106 and/or interface module 102.

In the delivery mode, control module 204 sets switching module 206a in an ON State to deliver power from bidirectional voltage converter circuit 202 to interface module 102. However, switching module 206b is set in an OFF state. Also, in the delivery mode switching module 206c is set to an ON state. This allows for energy storage module 104 to deliver power to power distribution module 106 (if switching element 206d is in an ON state).

Figure 3:
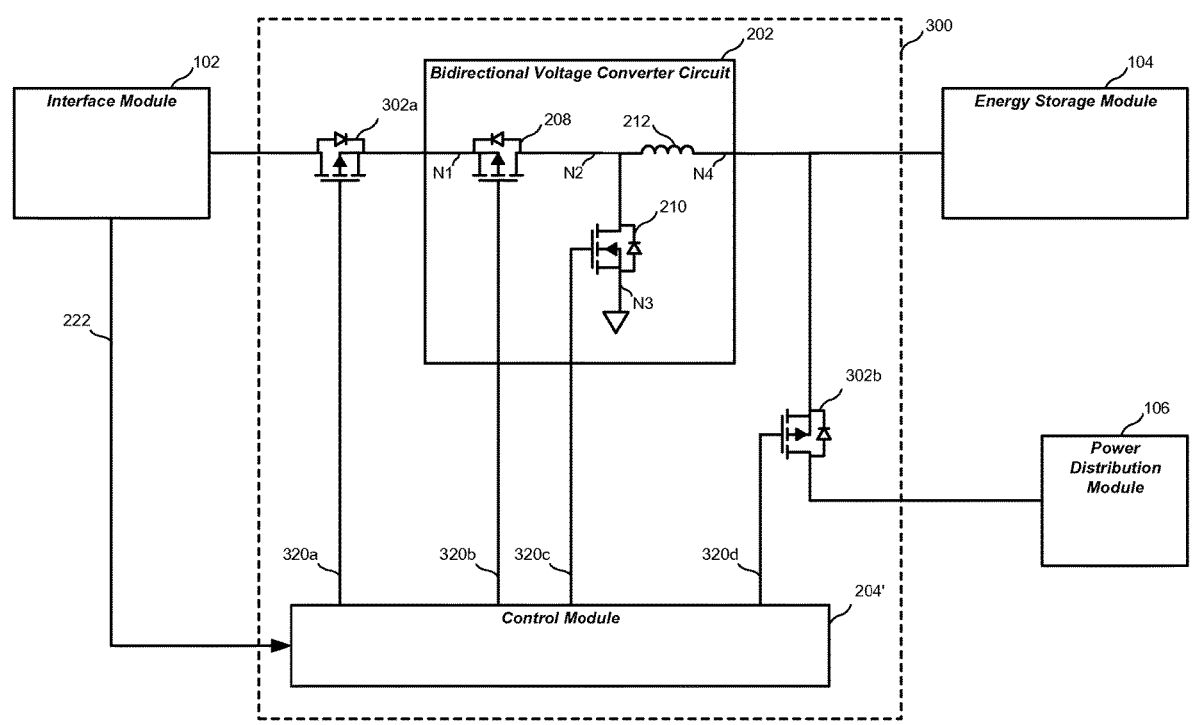

FIG. 3 is a diagram of a further implementation 300 that may be included in power management module 108. Implementation 300 is similar to the implementation of FIG. 2. However, implementation 300 replaces control module 204 with a control module 204'. Also, implementation 300 replaces switching elements 206a-d with switching elements 302a and 302b. As shown in FIG. 3, these switching elements may be implemented as MOSFETs. However, other types of devices may be employed.

Control module 204' may be implemented in hardware, software, firmware, or any combination thereof. As shown in FIG. 3, control module 204' generates control signals 320b and 320c, which operate switching elements 208 and 210 within bidirectional voltage converter circuit 202. This operation is based on whether implementation 300 is in the charging or delivery mode. Thus, this control may be in the manner described above with reference to FIG. 2.

Further, control module 204' operates switching elements 302a and 302b, through control signals 320a and 320d, respectively. For instance, control module 204' sets switching element 302a in an ON state when a device is attached to interface module 102. Also, control module 204' sets switching element 302d in an ON state when power distribution module 106 is to deliver power to various components. This may be based on a user selection and/or on automatic power delivery procedures.

As described above, embodiments may operate with various interface types and energy storage technologies. Exemplary embodiments employ USB interfaces that employ 5 volt power lines and Li-ion batteries that operate at voltages between 3.0 volts and 4.2 volts. Control modules 204 and 204' may operate switching elements in a manner such that bidirectional voltage conversion module converts between these voltages. The embodiments, however, are not limited to these interfaces, voltages, or storage technologies.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 4:
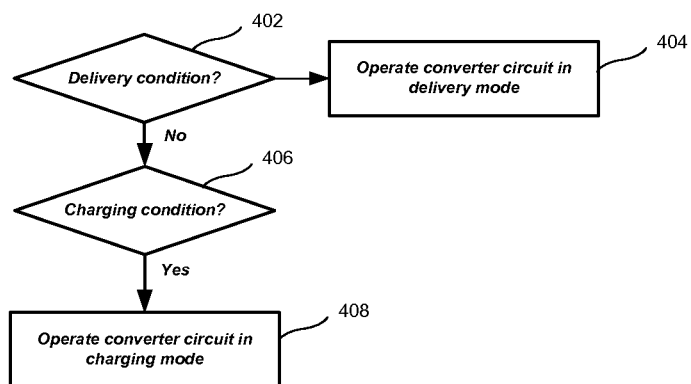
FIG. 4 is a flow diagram.

FIG. 4 illustrates one embodiment of a logic flow. In particular, FIG. 4 illustrates a logic flow 400, which may be representative of the operations executed by one or more embodiments described herein. This flow is described with reference to FIGS. 2 and 3. However, such operations are not limited to these exemplary contexts. Moreover, although FIG. 4 shows a particular sequence of operations, other sequences may be employed. Also, the depicted operations may be performed in various parallel and/or sequential combinations.

As shown in FIG. 4, logic flow 400 includes a block 402, which determines whether a charging condition occurs. For example, with reference to FIGS. 2 and 3, this may involve control module 204 (or 204') determining whether a device is attached to interface module 102 that provides charging power. An example of such a device is a power adapter. The embodiments, however, are not limited to such devices.

If a charging condition occurs, then operation proceeds to a block 404. At this block, a converter circuit (e.g., bidirectional voltage converter circuit 202) is operated in a charging mode.

At a block 406, it is determined whether a delivery condition exists. Referring again to FIGS. 2 and 3, this may involve determining whether a device requiring operational power is attached to interface module 102. An example of such a device is a jump drive. However, the embodiments are not limited to these devices. If a delivery condition occurs, then operation proceeds to a block 408. At this block, the converter circuit is operated in a delivery mode.

Figure 5:
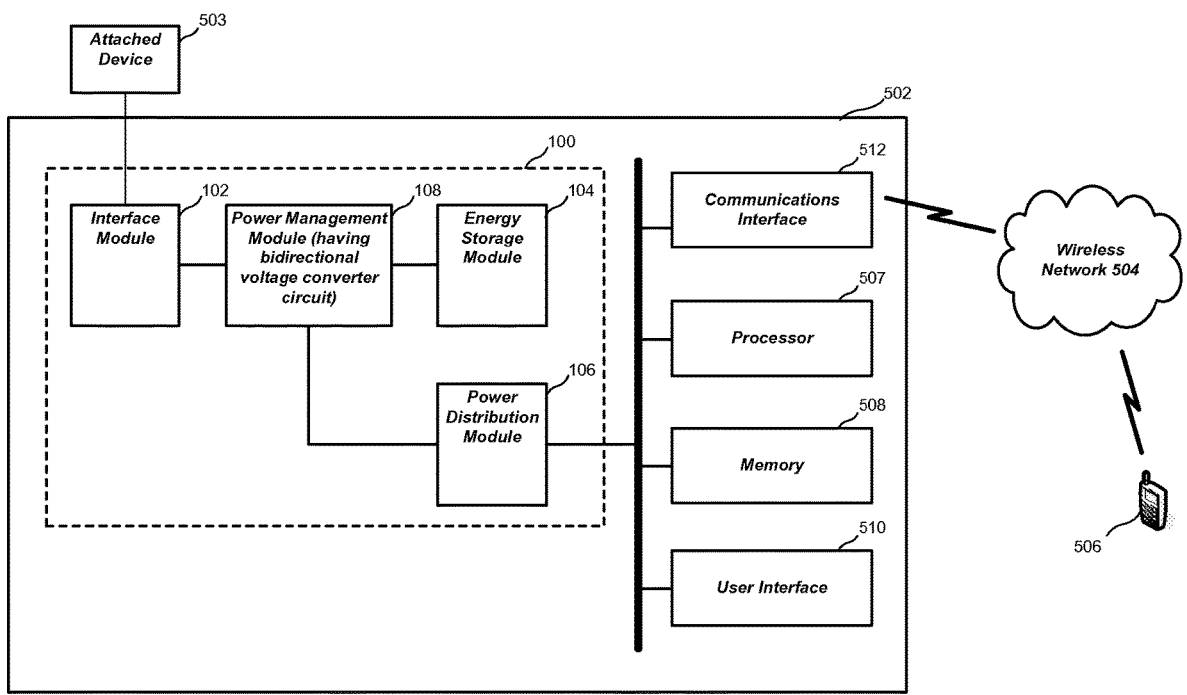
FIG. 5 is a diagram of a system embodiment.

FIG. 5 illustrates an embodiment of a system 500. This system may be suitable for use with one or more embodiments, such as apparatus 100, implementations 200 and 300, logic flow 400, and so forth. Accordingly, system 500 may perform power management techniques, such as the ones described herein.

As shown in FIG. 5, system 500 may include a device 502, an attached device 503, a communications network 504, and a remote device 506. Embodiments, however, are not limited to these elements. Device 502 may be a mobile communications device, such as a smartphone, a PDA, or a MID. However, device 502 may be other types of devices, such as a laptop computer, a desktop computer, and so forth. The embodiments, however, are not limited to these examples.

FIG. 5 shows that device 502 may include the elements of FIG. 1. However, device 502 may alternatively include elements of other embodiments. Also, device 502 may include a processor 507, a memory 508, a user interface 510, and a communications interface 512. These elements may be implemented in hardware, software, firmware, or any combination thereof.

Processor 507 may include one or more microprocessors, microcontrollers. Processor 507 may execute instructions to perform various operations. Such operations may involve user applications, communications processing, power management operations, and so forth.

Memory 508 may store information in the form of data. For instance, memory 508 may contain application documents, e-mails, sound files, and/or images in either encoded or unencoded formats. Alternatively or additionally, memory 508 may store control logic, instructions, and/or software components. This may include instructions that can be executed by one or more processors, such as processor 507. Such instructions may provide functionality of one or more elements.

It is worthy to note that some portion or all of memory 508 may be included in other elements of system 500. For instance, some or all of memory 508 may be included on a same integrated circuit or chip with elements of apparatus 100. Alternatively, some portion or all of memory 508 may be disposed on an integrated circuit or other medium (e.g., a hard disk drive). The embodiments are not limited to these examples.

Memory 508 may be implemented using any machine-readable or computer-readable media capable of storing data, including both volatile and non-volatile memory. For example, memory 508 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

User interface 510 facilitates user interaction with device 502. This interaction may involve the input of information from a user and/or the output of information to a user. Accordingly, user interface 510 may include one or more devices, such as a keyboard (e.g., a full QWERTY keyboard), a keypad, a touch screen, a microphone, and/or an audio speaker.

Communications interface 512 provides for the exchange of information with device 506. This exchange of information may be across one or more wireless or wired connections. For purposes of illustration, FIG. 5 shows communications interface 512 providing wireless connectivity to device 506 through a wireless network 504. Wireless network 504 may be a terrestrial cellular network, a satellite network, a wireless local area network (e.g., a WiFi network), a wireless metropolitan network (e.g., a WIMAX network), as well as other types of networks. Accordingly, communications interface 512 may include various components, such as a transceiver and control logic to perform operations according to one or more communications protocols.

Communications between device 502 and device 506 may include telephony and messaging. In addition, such communications may include the exchange of information, such as e-mail, calendar entries, contact information, application files, content (e.g., audio, image, and/or video), and so forth.

FIG. 5 shows that device 502 is coupled to an attached device 503. This coupling is through interface module 102. Power may flow between attached device 502 and energy storage module 104 according to the techniques described herein.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
    a battery;
    a bidirectional voltage converter configured to operate in a charging mode or a delivery mode;
    an interface module configured to receive first information from an attached device and to transmit second information to the attached device, the first information comprising power characteristics of the attached device, the second information comprising power characteristics of the system; and
    a control module configured to control the bidirectional voltage converter to operate in the charging mode or in the delivery mode based on the first information and the second information;
    wherein in the charging mode the bidirectional voltage converter converts a voltage supplied by the attached device into a charging voltage to at least charge the battery; and
    wherein in the delivery mode the bidirectional voltage converter converts a voltage provided by the battery into a voltage to at least be used by the attached device.

2. The system of claim 1, wherein the battery comprises a rechargeable lithium ion battery.

3. The system of claim 1, wherein the voltage supplied by the attached device to the interface module and the voltage provided by the battery are configured to provide different operational voltages.

4. The system of claim 3, wherein the attached device is configured to provide an operational voltage of 5 volts.

5. The system of claim 3, wherein the battery comprises a cell voltage between 3.0 volts and 4.2 volts.

6. A system, comprising:
    an interface configured to receive first information from an attached device and to transmit second information to the attached device, the first information comprising power characteristics of the attached device, the second information comprising power characteristics of the system;
    a battery;
    a bidirectional voltage converter configured to operate in a charging mode or a delivery mode; and
    a control module configured to control the bidirectional voltage converter to operate in the charging mode or in the delivery mode based on the first information and the second information;

wherein in the charging mode the bidirectional voltage converter converts a voltage supplied by the interface into a charging voltage to at least charge the battery; and wherein in the delivery mode the bidirectional voltage converter converts a voltage provided by the battery into a voltage to at least be used by the interface.

7. The system of claim 6, wherein the interface is a USB interface.

8. The system of claim 6, wherein a control signal is configured to be provided from the interface to the bidirectional voltage converter and includes information comprising whether the attached device provides power to the interface or requires power from the interface.

9. The system of claim 8, wherein, when the information indicates that the attached device provides power to the interface, the bidirectional voltage converter is configured to operate in the charging mode, and wherein, when the information indicates that the attached device requires power from the interface, the bidirectional voltage converter is configured to operate in the delivery mode.

10. The system of claim 6, wherein the battery comprises a rechargeable lithium ion battery.

11. The system of claim 6, wherein the voltage supplied by the interface and the voltage provided by the battery are configured to provide different operational voltages.

12. The system of claim 11, wherein the interface is configured to provide an operational voltage of 5 volts.

13. The system of claim 11, wherein the battery comprises a cell voltage between 3.0 volts and 4.2 volts.

14. An apparatus comprising:
an interface configured to receive first information from an attached device and to transmit second information to the attached device, the first information comprising power characteristics of the attached device, the second information comprising power characteristics of the apparatus;
a bidirectional voltage converter comprising:
a first switching device;
a second switching device; and
an inductor, the first and second switching devices coupled to a first terminal of the inductor; and
a control module configured to control the first and second switching devices to cause the apparatus to perform in one of a first mode and a second mode based on the first information and the second information, wherein, in the first mode, power is received through the inductor from the interface and wherein, in the second mode, power is provided to the interface through the inductor;
wherein in the first mode the bidirectional voltage converter converts the received power into a charging voltage to at least charge an energy storage module, and
wherein in the second mode the bidirectional voltage converter converts a voltage provided by the energy storage module into a voltage to at least be used by the attached device.

15. The apparatus of claim 14, wherein the control module is configured to periodically switch the first switching device in the first mode.

16. The apparatus of claim 14, wherein the control module is configured to periodically switch the second switching device in the second mode.

17. The apparatus of claim 14, wherein the attached device is configured to provide power to the interface when the apparatus is performing in the first mode, and a second attached device is configured to receive power from the interface when the apparatus is performing in the second mode.

18. The apparatus of claim 14, wherein the interface is a USB interface.

19. The apparatus of claim 14, further comprising a third device, a first terminal of the third device coupled to the interface and a second terminal of the third device coupled to a terminal of the first switching device.

20. The apparatus of claim 19, further comprising a fourth device, a terminal of the fourth device coupled to a second terminal of the inductor.

21. The apparatus of claim 16, further comprising the energy storage module and a fourth device, a terminal of the fourth device coupled to a terminal of the energy storage module.

22. The apparatus of claim 14, further comprising one or more of the energy storage module, a communications interface, a user interface, a memory and a processor, wherein the bidirectional voltage converter is configured to provide power to the one or more of the energy storage module, the communications interface, the user interface, the memory and the processor.

23. A system, comprising:
a battery;
an interface module configured to receive first information from an attached device and to transmit second information to the attached device, the first information comprising power characteristics of the attached device, the second information comprising power characteristics of the system; and
a power management module configured to provide bidirectional flow of power and to operate in a charging mode or a delivery mode, the power management module comprising a bidirectional power flow circuit, and the power management module configured to control the bidirectional power flow circuit to operate in the charging mode or in the delivery mode based on the first information and the second information;
wherein in the charging mode the power management module converts a voltage supplied by the attached device into a charging voltage to at least charge the battery; and
wherein in the delivery mode the power management module converts a voltage provided by the battery into a voltage to at least be used by the attached device.

24. The system of claim 23, wherein the bidirectional power flow circuit is comprised in an integrated circuit.

25. The system of claim 23, wherein the bidirectional power flow circuit comprises one or more switching elements, the one or more switching elements in the charging mode being in a different state from the one or more switching elements in the delivery mode.

26. The system of claim 23 further comprising a control module, wherein the control module is configured to receive information from the interface module and provide one or more control signals to indicate whether to operate in the charging mode or in the delivery mode.

27. The system of claim 23 further comprising a processor, the processor being configured to provide power management operations.

28. The system of claim 27, wherein the processor is coupled to the power management module.

29. The system of claim 23 further comprising a communications interface configured to enable exchange of information with the system.

30. The system of claim 29, wherein the communications interface is a wireless interface.

31. The system of claim 23, wherein the interface module couples the attached device to the bidirectional power flow circuit.

32. The system of claim 23, wherein the battery comprises a rechargeable lithium ion battery.

33. The system of claim 31, wherein the interface module is configured to provide an operational voltage of 5 volts.

34. The system of claim 31, wherein the battery comprises a cell voltage between 3.0 volts and 4.2 volts.

35. A system, comprising:
a battery;
a bidirectional voltage converter configured to operate in a charging mode or a delivery mode;
an interface module configured to receive first information from an attached device and to transmit second information to the attached device, the first information comprising power characteristics of the attached device, the second information comprising power characteristics of the system; and
a control module configured to provide one or more control signals, the one or more control signals to control the bidirectional voltage converter to operate in the charging mode or in the delivery mode based on the first information and the second information;
wherein in the charging mode the bidirectional voltage converter converts a voltage supplied by the attached device into a charging voltage to at least charge the battery; and
wherein in the delivery mode the bidirectional voltage converter converts a voltage provided by the battery into a voltage to at least be used by the attached device.

36. The system of claim 35, wherein the one or more control signals are configured to be provided to the bidirectional voltage converter.

37. The system of claim 35, wherein the interface module couples the attached device to one or more of the bidirectional voltage converter and the control module.

38. The system of claim 35, further comprising a wireless interface to enable exchange of information with the system.

39. The system of claim 35, wherein the battery comprises a rechargeable lithium ion battery.

40. The system of claim 35, wherein the voltage supplied by the attached device to the interface module and the voltage provided by the battery are configured to provide different operational voltages.

41. The system of claim 40, wherein the attached device is configured to provide an operational voltage of 5 volts within a tolerance of ±5%.

42. The system of claim 40, wherein the battery comprises a cell voltage between 3.0 volts and 4.2 volts.

43. A system, comprising:
an interface configured to receive first information from an attached device and to transmit second information to the attached device, the first information comprising power characteristics of the attached device, the second information comprising power characteristics of the system;
a battery;
a bidirectional voltage converter configured to operate in a charging mode or a delivery mode; and
a control module configured to control the bidirectional voltage converter to operate in the charging mode or in the delivery mode based on the first information and the second information;
wherein in the charging mode the bidirectional voltage converter converts a voltage supplied from the attached device into a charging voltage to at least charge the battery; and
wherein in the delivery mode the bidirectional voltage converter converts a voltage provided by the battery into a voltage supplied to the attached device.

44. The system of claim 43, wherein the interface is a USB interface.

45. The system of claim 43, wherein a control signal is configured to be provided to the bidirectional voltage converter and conveys information comprising whether the attached device provides power to the interface or requires power from the interface.

46. The system of claim 45, wherein, when the information indicates that the attached device provides power to the interface, the bidirectional voltage converter is configured to operate in the charging mode, and wherein, when the information indicates that the attached device requires power from the interface, the bidirectional voltage converter is configured to operate in the delivery mode.

47. The system of claim 43, wherein the battery comprises a rechargeable lithium ion battery.

48. The system of claim 43, wherein the voltage supplied by the attached device to the interface and the voltage provided by the battery are configured to provide different operational voltages.

49. The system of claim 48, wherein the attached device is configured to provide an operational voltage of 5 volts.

50. The system of claim 48, wherein the battery comprises a cell voltage between 3.0 volts and 4.2 volts.

51. The system of claim 1, wherein the interface module further comprises a USB interface to receive the first information and to transmit the second information.

52. The system of claim 1, wherein the interface module further comprises a wireless interface to receive the first information and to transmit the second information.

53. The system of claim 6, wherein the interface further comprises a USB interface to receive the first information and to transmit the second information.

54. The system of claim 6, wherein the interface further comprises a wireless interface to receive the first information and to transmit the second information.

55. The apparatus of claim 14, wherein the interface further comprises a USB interface to receive the first information and to transmit the second information.

56. The apparatus of claim 14, wherein the interface further comprises a wireless interface to receive the first information and to transmit the second information.

57. The system of claim 23, wherein the interface module further comprises a USB interface to receive the first information and to transmit the second information.

58. The system of claim 23, wherein the interface module further comprises a wireless interface to receive the first information and to transmit the second information.

59. The system of claim 35, wherein the interface module further comprises a USB interface to receive the first information and to transmit the second information.

60. The system of claim 35, wherein the interface module further comprises a wireless interface to receive the first information and to transmit the second information.

61. The system of claim 43, wherein the interface further comprises a USB interface to receive the first information and to transmit the second information.

62. The system of claim 43, wherein the interface further comprises a wireless interface to receive the first information and to transmit the second information.

\* \* \* \* \*